Oct. 20, 1931.  J. H. WALTERS  1,828,551
STOCK RACK FOR VEHICLES
Filed Sept. 18, 1928  3 Sheets-Sheet 1
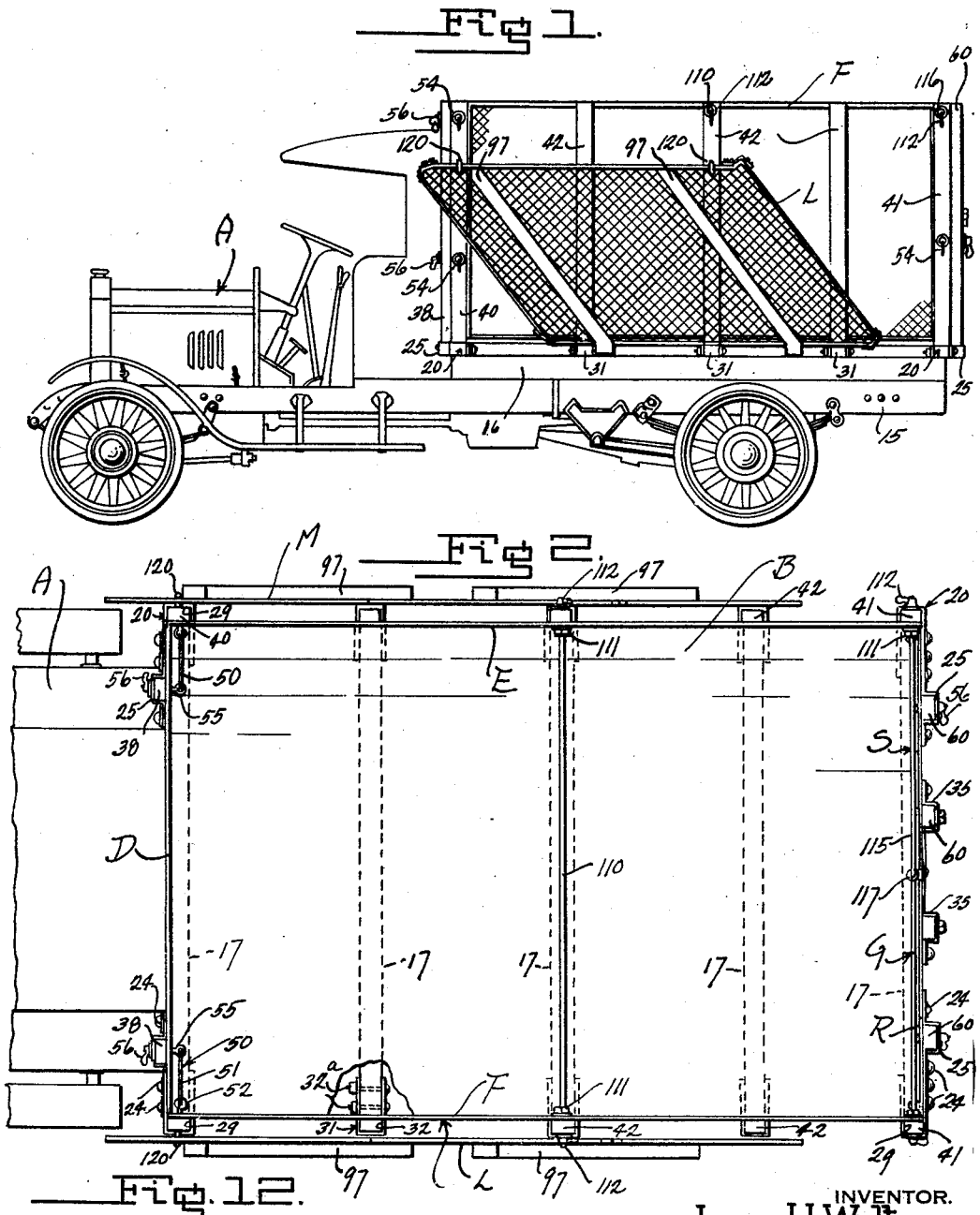
INVENTOR.
Jesse H. Walters
BY
ATTORNEYS.

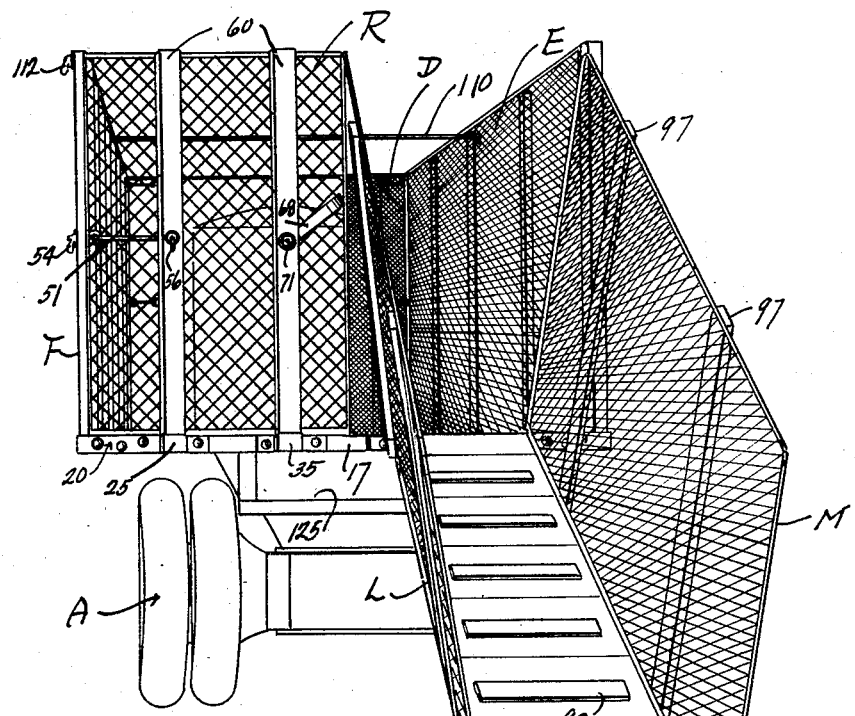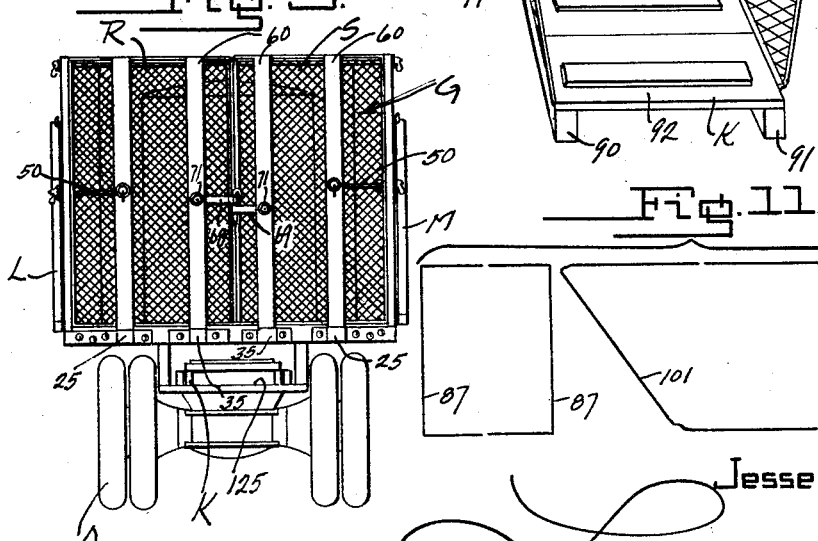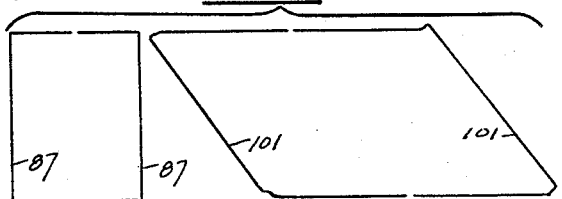

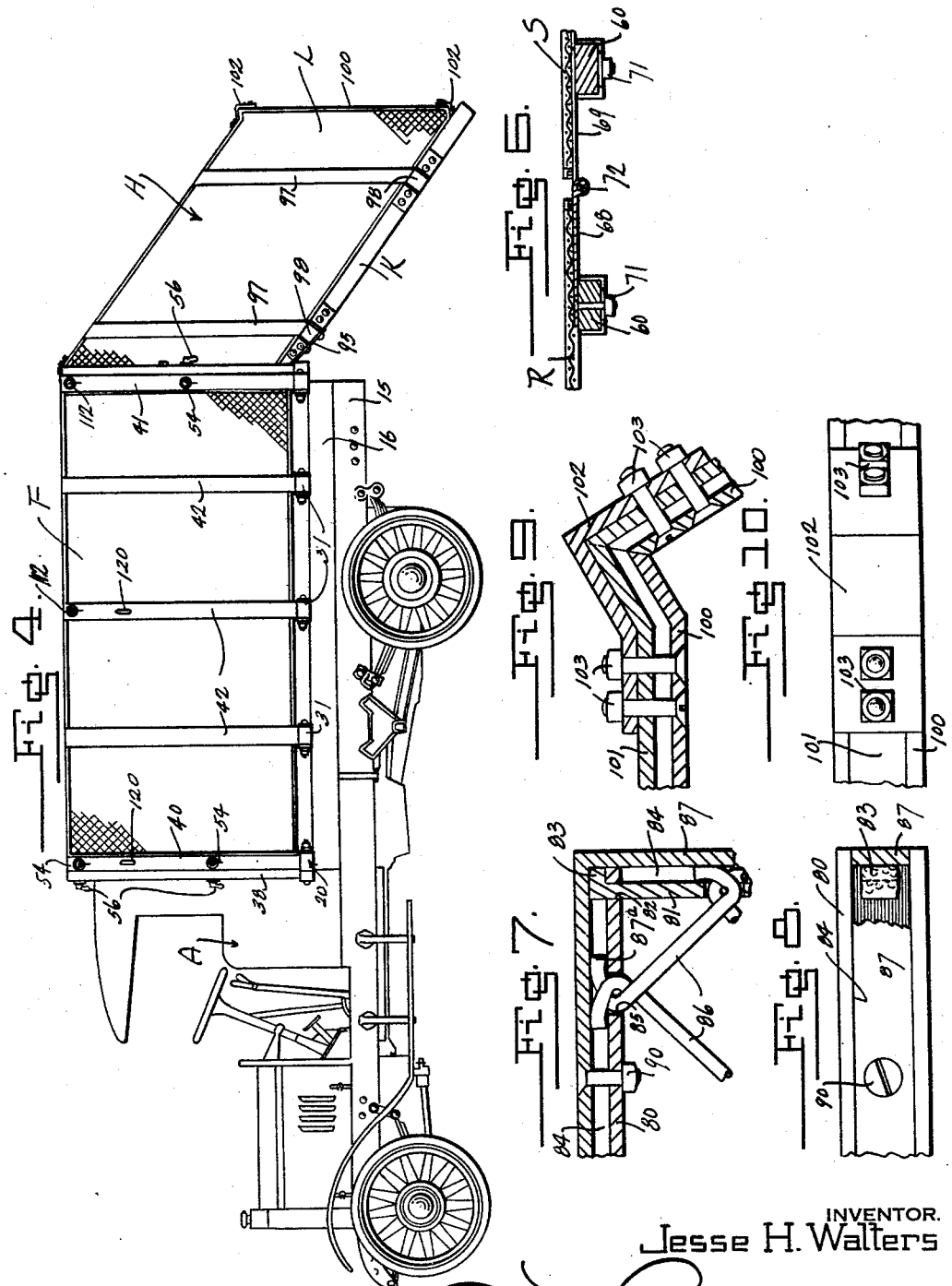

Patented Oct. 20, 1931

1,828,551

UNITED STATES PATENT OFFICE

JESSE H. WALTERS, OF HEBRON, OHIO

STOCK RACK FOR VEHICLES

Application filed September 18, 1928. Serial No. 306,764.

This invention relates to improvements in stock racks for vehicles.

The primary object of this invention is the provision of a preferably removable stock rack for the bodies of automotive vehicles, which embodies an improved reticulated wall construction having a novel removable loading chute associated therewith.

A further object of this invention is the provision of a removable vehicle body construction, particularly well adapted to be used for loading and unloading stock; the same including a novel loading chute which may be removably associated with the vehicle in an operative loading or unloading relation at the rear thereof to either side of the medial line of the vehicle, and by means of which stock may be loaded in the most convenient relation.

A further object of this invention is the provision of a novel panel or wall construction for vehicle stock racks.

Other objects and advantages of this invention will be apparent during the course of the following detailed description.

In the accompanying drawings, forming a part of this specification, and wherein similar reference characters designate corresponding parts throughout the several views.

Figure 1 is a side elevation of the improved stock rack, showing the same in position for transporting stock.

Figure 2 is a plan view of the stock rack in the position in which the parts are associated for traveling.

Figure 3 is a rear view of the stock rack as it appears when closed for transporting stock.

Figure 4 is a side elevation of the improved stock rack, with the loading chute in position for loading or unloading stock.

Figure 5 is a rear view, partially in perspective, of the improved stock rack, with the loading chute in position for loading or unloading the stock.

Figure 6 is a sectional view taken through a latch construction for holding the rear panels of the loading rack in closed relation.

Figure 7 is an enlarged fragmentary sectional view showing the manner in which the panels or walls of the improved stock rack are constructed.

Figure 8 is a fragmentary sectional view showing other details of the panel construction.

Figure 9 is a corner sectional view of one of the side walls of the loading chute.

Figure 10 is a fragmentary edge elevation of the details shown in Figure 9.

Figure 11 is a diagrammatic representation of the manner in which finishing strips are applied in the channels of the rear panels of the stock rack and the side walls of the loading chute.

Figure 12 is a plan view of a socket strap adapted to be attached to the beam or transom at the corners of the vehicle body platform to provide sockets for receiving the uprights of the stock rack panels.

In the drawings, wherein for the purpose of illustration is shown only a preferred embodiment of the invention, the letter A may generally designate an automotive vehicle which is provided with a permanent body platform B adapted to receive the stock rack construction C. The construction C comprises a front wall D; side walls E and F; a rear wall construction G, and a novel loading chute structure H which consists of a runway K and side walls L and M.

The vehicle A is of an approved type, including the chassis rails 15 upon which longitudinal beams 16 are mounted. Cross beams or transoms 17 are placed upon the beams 16, and thereupon is mounted the permanent platform B.

Iron socket providing straps 20 are placed at the corners of the permanent floor of body of the vehicle; the same being of a nature for attachment to the ends of the foremost and rearmost cross beams 17, as best illustrated in Figure 2 of the drawings. This socket strap 20, as shown in Figure 12 of the drawings, is provided with a relatively long flat portion 22 adapted to be riveted, as shown at 24 in Figure 2 of the drawings, to the sides of the front and rear beams 17; the same having a socket offset 25 therein for receiving the lower ends of uprights of the front and rear wall constructions of the stock rack, as will be more particularly referred to hereinafter. It is provided with a U-shaped end 27, adapted to fit over the extreme ends of the front and rear cross beams 17, to provide sockets 29, shown in Figure 2 of the drawings, for receiving the front and rear uprights of the side walls E and F.

The intermediate cross beams 17 are provided with U-shaped socket straps 31 bolted or secured as at 32ª over the ends of the intermediate cross beams 17, to provide sockets 32 for receiving the intermediate uprights of the side walls E and F, in a detachable relation.

On the rear face of the rearmost cross beam 17, other socket straps 35 are provided, one at each side of the medial line of the vehicle, providing sockets for the adjacent uprights of the panels or sections of the rear stock rack walls G, as will be subsequently described.

The front wall D and side walls E and F, as well as the panels of the rear walls G are each constructed of a reticulated wire mesh body, in which the ends of the wires are angled in channel irons forming the boundaries of said walls, and the construction of which will be subsequently described, in detailing the structure of the rear wall panels. The front wall is preferably provided with vertical uprights 38, preferably of wood, appropriately secured rigidly to the outer side of said wall, close to the opposite vertical edges thereof, and which uprights 38 project sufficiently below the lower edges of the walls D to be received in the socket portions 25 of the straps 20 above described, and as is illustrated in Figure 2 of the drawings, and this initially holds the wall D in a vertical position at the front of the stock rack.

Similarly, the side walls E and F have a reticulated body mounted by metal channel parts, rigidly secured together, and on the outset surfaces thereof are provided with front and rear vertical uprights 40 and 41, and intermediate vertical uprights 42, as shown in Figure 4 of the drawings. These vertical uprights of the side walls, extend at their lower ends, below the lower bounding channels of the respective side walls, for reception in the socket openings 29 and 32 of the cross beam socket providing straps 20 and 31 above described, and as is well shown in Figures 2 and 4 of the drawings, and elsewhere.

Tie couplings 50 are provided at the corner junctures of the front and side walls; preferably two of each of said tie couplings being employed at each of the vertical sides of the front wall. As shown in Figure 2, they consist of a tie rod 51, having an eye beam bolt 52 pivoted at one end thereof, for adjustable connection in the standard 40 of one of the side walls; said eye bolt 52 being threaded and adapted for insertion at right angles through the uprights 40, to receive thumb nuts 54 at the outer sides of said standards 40, as shown in Figure 4 of the drawings. At their opposite ends the tie rods 50 are provided with similar eye bolts 55, for disposition through the vertical front wall standards 38; the same being secured as by thumb nuts 56 thereto. These tie rod structures 50 hold the front end of the side walls to the front wall in a connected right angled braced relation at the top thereof, and between the top and lower socket connections.

The rear wall structure G preferably comprises independently detachable panel sections R and S, at the left and right sides of the medial center line of the truck body. They are of identical formation, substantially rectangular in form, and comprising reticulated bodies held on a rectangular shaped channel frame. Each of the panels R and S are provided with a pair of parallel vertical uprights 60 at the outer sides thereof, the lower ends of which project below the lower channel frame for seating in the sockets 35 and 25 in a detachable relation, as shown in Figure 3 of the drawings. Corner tie rod structures 50, exactly similar to the tie rods of the structures 50 above described, are provided for tying the rear panels at the corner junctures with the side walls E and F, as shown in Figure 3 of the drawings.

To hold the adjacent edges of the panels R and S in a braced relation, a latch is provided, consisting of pivoted eye straps 68 and 69, shown in Figure 3, pivoted at 71 on the uprights 60 of the panels R and S; which may be moved to align the eyes for detachably receiving a tie bolt 72.

The structure of the walls or panels forming the rack body, as above mentioned is that of crossed wire strands forming a reticulated body; the ends of the wires being anchored in channels forming the boundaries of these walls. This is shown in Figure 7 of the drawings, wherein channels 80 and 81 are connected by providing an opening 82 in the end of one channel wherein the end of the other channel is received and peened over at 83. The grooves 84 of the channels face outwardly, and the channels are perforated at 85, at desired distances, and the ends of the wires 86 are disposed therein and bent over at 87ª. Finishing strips 87 are seated in the grooves 84 of the channels and bolted in place as at 90 to lock the wires in position against accidental pulling out or removal. For the side, front and rear panels the finishing strips 87 may be as shown in Figure 11 of the drawings, where a pair of U-shaped strips 87 are shown in the position in which they seat in the channels to form a complete boundary or finishing for the channels of the walls.

Referring to the loading chute construction

H, the same is adapted for attachment to the rear of the truck at either side of the medial center line thereof; necessitating merely the removal of one of the rear wall panels R or S.

The runway K preferably comprises longitudinal beams 90 and 91 having the cross boards 92 secured thereon and provided with anti-slip cleats 93 on the upper surface thereof. At its upper end the beams of the runway K are provided with hooks 95, which may engage in the sockets 25 and 35 to hold the runway in position. These hooks 95 are of ordinary hook formation, and of course the beams 90 and 91 are spaced according to the spacing of the sockets 25 and 35, to accurately position the runway with respect to the removal panel.

The side walls L and M are of reticulated wire body construction, bounded by channel irons similar to that above described for the body walls. These two walls L and M are each parallelograms, in the shape of a rhomboid, and they are provided with substantially vertical standards 97 at the outer sides thereof, the lower ends of which are acutely angled and extended below the lower boundary rails of the respective chute side walls and adapted for detachable seating in sockets 98 attached to the outer sides of the runway beams 90 and 91, as shown in Figure 4 of the drawings. These lower ends of the standards 97 are so angled that when seated in their sockets 98 the walls L and M will flare upwardly in a divergent relation to permit relatively large stock to be loaded with ease. If desired, the upper ends of the side walls may be suitably braced upon the other walls of the body structure to hold the flaring relation.

The channels 100 forming the boundaries or frames for the side walls L and M, as shown in Figure 9 of the drawings may be provided with finishing strips 101 to seat in the grooves thereof; angle reinforcing corner clips 102 being bolted at 103, in position. The finishing strips 101, in the relation in which they are formed to seat in the grooves of the angles 100 are best shown in Figure 11 of the drawings. It is necessary to offset the corners of the bounding angles of the walls L and M, as shown in Figures 1 and 4, to provide durable corner joints.

Cross ties may be provided for the side walls E and F, preferably consisting of an intermediate tie rod 110 which may be threaded at its ends and provided with nuts 111. The threaded ends are inserted through openings provided in the top of opposed standards 42 so that the nuts 111 rest against the insides of the walls E and F, and the outer threaded ends of the tie rod 110 receive thumb nuts 112 to clamp the tie rod in position for holding the walls E and F in a rigidly braced relation between the front and rear walls of the rack. Similarly, the rear ends of the side walls are braced by a two piece tie rod structure, consisting of sections 115 and 116, detachably held in a pivoted relation at eyes 117. They are connected to the upper ends of the rearmost vertical uprights 41 in the manner above described for the tie rod 110, by similar nuts 111 and thumb nuts 112, as shown in Figure 2. This rear tie rod may be detached when relatively tall stock is being loaded. Otherwise it remains in position during the loading or unloading and transporting positions of the parts.

It is readily understandable from the foregoing that the chute structure may be readily positioned with ease upon the rear of the truck at either side of the medial line of the truck body, while removing one or the other of the rear wall panels R and S. By positioning the loading chute at one side of the medial line of the truck body, relatively inexcessible loading locations may be reached with ease, as will be well understood by those skilled in this art.

When the stock is to be transported, the walls L and M are of course detached from the runway K, and they are hung at opposite sides of the truck body, on suitable hooks 120 provided on the standards of the side walls E and F, as shown in Figures 1 and 2 of the drawings. The runway K during transportation is slipped within a suitable pocket 125, longitudinally provided therefor beneath the floor of the vehicle, as shown in Figure 3, and held therein in any suitable manner. It is thus positioned for convenient use when desired.

It is apparent from the foregoing that a novel type of stock rack, of reticulated relation or construction, has been provided, the parts of which may be detachably positioned in a rigidly braced relation upon a truck body, in a simple and economical manner; a loading chute being detachably positioned for use in an efficient relation at the rear of the vehicle.

Various changes in the shape, size, and arrangement of parts may be made to the form of invention herein shown and described, without departing from the spirit of the invention or the scope of the claims.

I claim:

1. In a stock rack the combination of a vehicle body having a platform, front and side walls for the body, a detachable rear wall structure having means to open the rack at one side or the other of the center of the rear wall structure, a loading chute, and means to cooperatively position the chute in a loading relation with the platform and rear wall structure entirely to one side of the medial center line of the vehicle.

2. In a stock rack for vehicles the combination of a vehicle body having sockets at the rear thereof, bounding walls at the front and sides of the vehicle body, a rear wall structure comprising a pair of panels having means to detachably connect to the said sockets, whereby either of the panels may be removed independent of the other, a stock loading chute, and means associated with the loading chute for connecting the same upon the sockets of either of the rear wall panels upon removal of the respective adjacent rear wall panels.

3. In a stock rack for vehicles the combination of a vehicle body, front side and rear walls, the rear wall comprising a pair of sections independently movable to open the rear of the rack at either side of the center of the rear wall, means for connecting each of said sections to the rear ends of adjacent side walls, means for connecting said sections detachably at their adjacent main edges, a loading chute only of a width substantially the same as one of the rear wall sections, and means for connecting the loading chute to the rear of the vehicle body at either side of the medial center line of the vehicle body to align with the opening in the rear wall left by appropriate movement of either rear wall section.

JESSE H. WALTERS.